US012703454B2

(12) United States Patent
McCormick

(10) Patent No.: US 12,703,454 B2
(45) **Date of Patent: *Aug. 11, 2026**

(54) ADJUSTABLE AXLE RETAINING STRUCTURE

(71) Applicant: Fox Factory, Inc., Duluth, GA (US)

(72) Inventor: Daniel McCormick, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,370

(22) Filed: Dec. 21, 2023

(65) Prior Publication Data

US 2024/0308617 A1 Sep. 19, 2024

Related U.S. Application Data

(63) Continuation of application No. 17/943,048, filed on Sep. 12, 2022, now Pat. No. 11,884,358, which is a continuation of application No. 16/844,390, filed on Apr. 9, 2020, now Pat. No. 11,459,057.

(60) Provisional application No. 62/833,532, filed on Apr. 12, 2019.

(51) Int. Cl.

| | |
|---|---|
| ***B62K 25/08*** | (2006.01) |
| ***B60B 27/02*** | (2006.01) |
| ***B62L 1/00*** | (2006.01) |
| *B62K 21/02* | (2006.01) |
| *B62K 25/04* | (2006.01) |

(52) U.S. Cl.

CPC ............ *B62K 25/08* (2013.01); *B60B 27/026* (2013.01); *B62L 1/005* (2013.01); *B62K 21/02* (2013.01); *B62K 2025/044* (2013.01)

(58) Field of Classification Search

CPC .. B62K 25/08; B62K 21/02; B62K 2025/044; B60B 27/026; B62L 1/005

See application file for complete search history.

(56) References Cited

U.S. PATENT DOCUMENTS

| | | | | |
|---|---|---|---|---|
| 4,763,957 | A | 8/1988 | Poehlmann et al. | |
| 6,089,675 | A | 7/2000 | Schlanger | |
| 6,296,322 | B1 | 10/2001 | Marzocchi et al. | |
| 6,374,975 | B1 | 4/2002 | Schlanger | |
| 7,722,129 | B2 | 5/2010 | Cusack | |
| 7,896,381 | B2 | 3/2011 | Addink | |
| 7,909,412 | B2 | 3/2011 | Ashman | |
| 9,815,329 | B2 | 11/2017 | Schlanger | |
| 9,862,452 | B2 * | 1/2018 | Spahr | B62K 25/02 |
| 9,963,190 | B1 * | 5/2018 | Liu | F16B 7/0426 |
| 10,676,149 | B2 | 6/2020 | Schlanger | |

(Continued)

*Primary Examiner* — Toan C To

(57) ABSTRACT

An adjustable axle retaining structure is disclosed. The structure includes an axle receiving feature on a first leg of a fork assembly and a retaining sleeve within a clamping member on a second leg of the fork assembly. An axle is inserted through the clamping member, the wheel hub and coupled with the axle receiving feature. A component of the axle is tightened thereby moving the retaining sleeve partially out of the clamping member and toward the wheel hub until the wheel hub is in contact with both the retaining sleeve and the axle receiving feature, wherein the moving of the retaining sleeve allows the axle to radially couple the wheel hub with the fork assembly without modifying a preestablished geometry of the fork assembly.

19 Claims, 8 Drawing Sheets

(56) References Cited

U.S. PATENT DOCUMENTS

| | | | | |
|---|---|---|---|---|
| 10,766,301 | B2 * | 9/2020 | Oka | B60B 35/004 |
| 11,458,765 | B2 * | 10/2022 | Spahr | B62K 25/02 |
| 11,459,057 | B2 | 10/2022 | Mccormick | |
| 11,884,358 | B2 * | 1/2024 | McCormick | B62K 25/30 |
| 11,975,802 | B1 * | 5/2024 | Badenhorst | B60B 27/023 |
| 2009/0274406 | A1 | 11/2009 | Spahr et al. | |
| 2009/0315295 | A1 | 12/2009 | Laird et al. | |
| 2013/0044502 | A1 | 2/2013 | Guzik et al. | |
| 2016/0089930 | A1 | 3/2016 | Schlanger | |
| 2016/0114626 | A1 | 4/2016 | Schlanger | |
| 2016/0121961 | A1 | 5/2016 | Schlanger | |
| 2016/0368318 | A1 * | 12/2016 | Van Druten | B62K 25/02 |
| 2017/0036729 | A1 * | 2/2017 | Nakajima | B62K 25/02 |
| 2018/0334218 | A1 | 11/2018 | Schlanger | |
| 2019/0111733 | A1 | 4/2019 | Lai | |
| 2019/0152258 | A1 * | 5/2019 | Madhaven | B60B 35/004 |
| 2020/0180726 | A1 | 6/2020 | Kozak | |

* cited by examiner 108b
73
358
355
X
93
114
150
425
300
430
310
311
365
305
108a

ADJUSTABLE AXLE RETAINING STRUCTURE

CROSS-REFERENCE TO RELATED APPLICATIONS

This application is a Continuation of and claims priority to and benefit of U.S. patent application Ser. No. 17/943,048, filed on Sep. 12, 2022, entitled "ADJUSTABLE AXLE RETAINING STRUCTURE" by Daniel McCormick, and assigned to the assignee of the present application, the disclosure of which is hereby incorporated by reference in its entirety.

The application Ser. No. 17/943,048 claims priority to and benefit of U.S. patent application Ser. No. 16/844,390, filed on Apr. 9, 2020, now U.S. Pat. No. 11,459,057, entitled "ADJUSTABLE AXLE RETAINING STRUCTURE" by Daniel McCormick, and assigned to the assignee of the present application, the disclosure of which is hereby incorporated by reference in its entirety.

The application Ser. No. 16/844,390 claims priority to and benefit of U.S. Provisional Patent Application No. 62/833,532 filed on Apr. 12, 2019, entitled "ADJUSTABLE AXLE RETAINING STRUCTURE" by Daniel McCormick, and assigned to the assignee of the present application, the disclosure of which is hereby incorporated by reference in its entirety.

FIELD OF THE INVENTION

Embodiments of the invention generally relate to the field of wheel retention with a vehicle.

BACKGROUND

Front forks of a vehicle are used in conjunction with an axle, a wheel hub and a wheel to provide a front end on a vehicle. The retention of the hub of the front wheel with respect to the front forks is an area of significant study. Moreover, as shocks are incorporated into the front fork design, the geometry is ever more important to ensure the longevity and operation of the front shocks.

BRIEF DESCRIPTION OF THE DRAWINGS

Aspects of the present invention are illustrated by way of example, and not by way of limitation, in the accompanying drawings, wherein.

Figure 1:
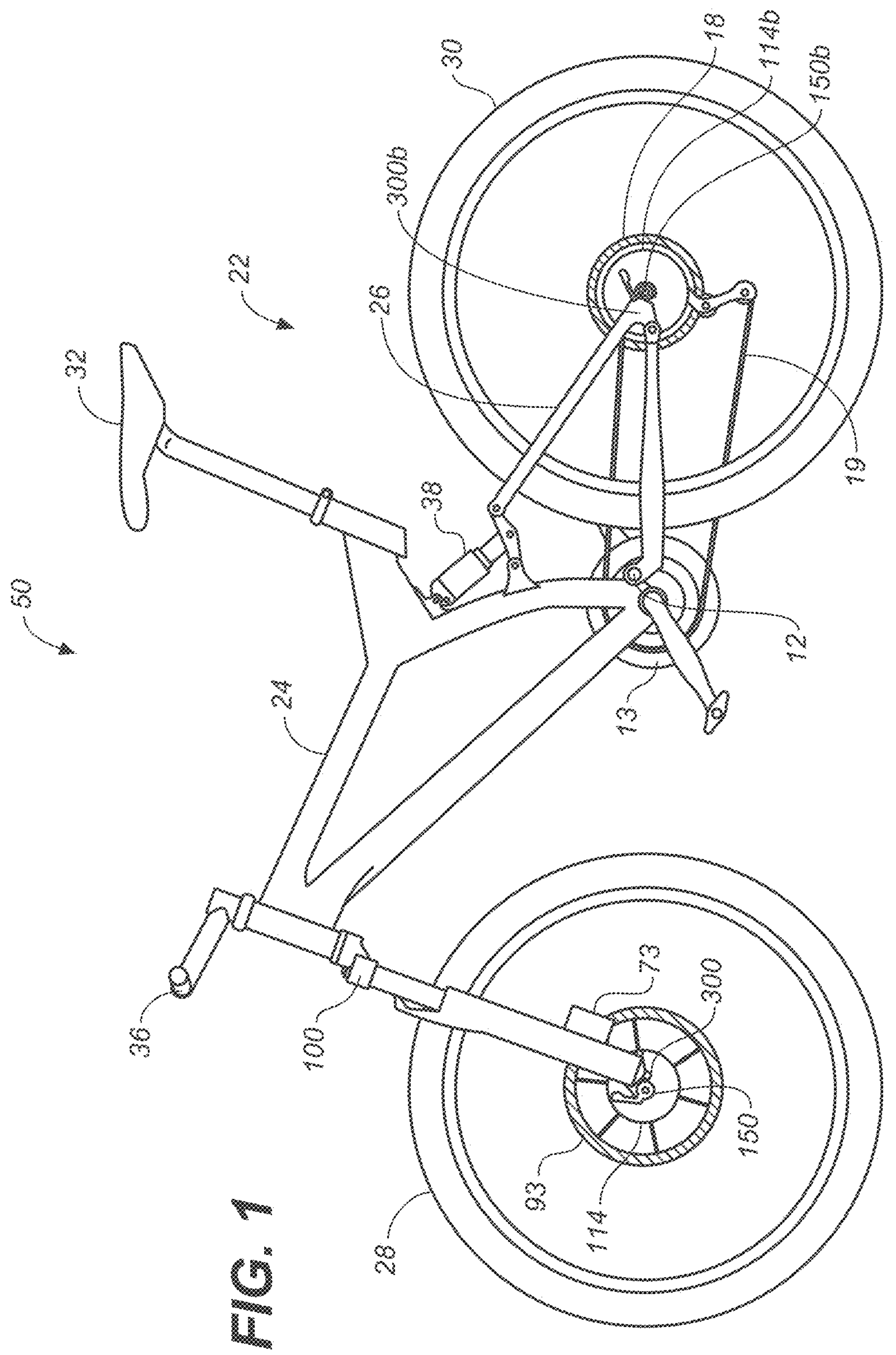
FIG. 1 is a perspective view of a bicycle having an adjustable axle retaining structure, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Embodiments described herein provide an interface width between a fork and a wheel hub that is adjustable to compensate for differing mounting widths between the fork and the hub. The fork width adjustment is done in a way that does not put the fork in bending, hence preserving the axial alignment between the two sides of the fork after the wheel hub is installed. In one embodiment, once this width adjustment is made for a given wheel hub, it is set so it does not need to be adjusted again for that specific wheel hub, regardless of the removal and reinstallation of the wheel hub.

In the following discussion, and for purposes of clarity, a bicycle is utilized as the example vehicle for showing the adjustable axle retaining structure. However, in one embodiment, the adjustable axle retaining structure is applicable to motorcycles, bicycles, e-bikes, scooters, tricycles, and the like. Moreover, in one embodiment, the adjustable axle retaining structure is applicable in traditional forks, upside down (or inverted) forks, and hybrid forks.

In one embodiment the adjustable axle retaining structure uses a sleeve (or other geometrically shaped component) in an axle retaining portion a lower fork tube. The sleeve is able to receive and retain a portion of an axle. In one embodiment, the sleeve is free to translate and/or rotate with respect to the axle retaining portion of the lower fork tube during initial setup to establish an acceptable geometry between the wheel and the lower fork tubes. After the initial setup, the sleeve is translationally and rotationally fixed to the lower fork tube such that the acceptable geometry is maintained when the wheel is removed and then replaced (such as for a flat tire, disassembly for travel, etc.).

In one embodiments the adjustable axle retaining structure uses two sleeves (or other geometrically shaped component), one sleeve in each axle retaining portion of each lower fork tube. Each sleeve is able to receive and retain a portion of an axle. In one embodiment, during initial setup, each sleeve is free to translate and/or rotate with respect to its axle retaining portion of its lower fork tube to establish an acceptable geometry between the wheel and the lower fork tubes. After the initial setup, the sleeves are translationally and rotationally fixed to the lower fork tubes such that the acceptable geometry is maintained when the wheel is removed and then replaced (such as for a flat tire, disassembly for travel, etc.).

Thus, in one embodiment the disclosed adjustable axle retaining structure allows width compensation to be performed only at initial setup for a given fork/wheel hub combination. Additional width adjustment is not required, for example at each wheel removal/reinstall. Moreover, the disclosed adjustable axle retaining structure has the advantages of floating axle designs, e.g., one or both of the lower fork tubes is not put in bending due to axial loads through the front axle. In one embodiment, the adjustable axle retaining structure uses a tool-free quick release style axle retaining configuration. In one embodiment, the adjustable axle retaining structure uses a tool style axle retaining configuration such as a torque (e.g., Kabolt style), or the like.

Referring now to FIG. 1, a perspective view of a bicycle 50 having an adjustable axle retaining structure 300 is shown in accordance with an embodiment. In one embodiment, bicycle 50 includes a seat 32, a frame 22, a front fork assembly 100, a front wheel assembly 28, and a rear wheel assembly 30.

In one embodiment, frame 22 is a rear-suspension frame that consists of a main frame 24 and a swing arm portion 26. In one embodiment, swing arm portion 26 is coupled to the main frame 24 via a pivot point 12 and a rear shock 38, such that swing arm portion 26 is able to move in a longitudinal plane relative to main frame 24. In general, this longitudinal movement of swing arm portion 26 with respect to main frame 24 is fixed at pivot point 12 while the range of motion is defined by rear shock 38. Although a pivot point and shock are shown, other methods of providing rear suspension could also be used.

In one embodiment, frame 22 is a rigid frame (e.g., a hard tail). For example, main frame 24 is fixedly attached to swing arm portion 26 without any pivot point(s) or shock(s). In one embodiment, the rigid frame 22 is manufactured as a single component instead of a main frame 24 and swing arm portion 26.

In one embodiment, bicycle 50 is a full suspension bicycle. For example, the front fork assembly 100 includes a damper in at least one fork leg to provide a front suspension and frame 22 includes a rear shock 38 to provide a rear suspension. In another embodiment, bicycle 50 has only a front suspension and no rear suspension (e.g., a hard tail). For example, the front fork assembly 100 includes a damper in at least one fork leg to provide a front suspension, and frame 22 is a rigid frame providing no rear suspension. In yet another embodiment, bicycle 50 could be rigid. That is, it has no front or rear suspension. In different embodiments, instead of being used on bicycle 50 adjustable axle retaining structure 300 could be used in applications to include, a road bike, a mountain bike, a gravel bike, an e-bike, a unicycle, a motorcycle, or the like.

In one embodiment, front wheel assembly 28 includes a rim fixedly coupled via a series of spokes (or the like) to a wheel hub 114. In one embodiment, front wheel assembly 28 also includes a removeable axle 150 and a tire removably coupled to an outer perimeter of the rim. In one embodiment, wheel hub 114 is located in the center of the inner perimeter of the front wheel assembly 28 and has an axial opening in a center thereof. In one embodiment, wheel hub 114 has at least one rotor 93 of a disk brake assembly mounted thereto. In one embodiment, axle 150 is inserted through the axial opening in the center of wheel hub 114, such that the front wheel assembly 28 is perpendicular to and rotatable about axle 150.

In one embodiment, a lower portion (where the lower and higher distinction is defined by a distance from the ground plane when the bike 50 is in an erect orientation) of fork assembly 100 includes adjustable axle retaining structure 300 (which is shown and described in further detail in FIGS. 2A-4C). In general, adjustable axle retaining structure 300 retains axle 150 and in so doing, provides a rotational connection between front wheel assembly 28 and fork assembly 100.

In one embodiment, the lower portion of fork assembly 100 has at least one caliper 73 of the disk brake assembly mounted thereto. In one embodiment, adjustable axle retaining structure 300 is used to position axle 150 and thus wheel hub 114, such that the front wheel assembly 28 is correctly aligned between the fork tubes and that rotor 93 is properly aligned with caliper 73.

In one embodiment, the upper portion of fork assembly 100 includes a steerer tube 101 (shown in FIG. 2A) which is inserted through a head tube in frame 22 (or main frame 24) and is coupled to a handlebar assembly 36 via a stem (or the like). In one embodiment, the head tube contains a headset to act as an interface between the steerer tube 101 and the frame 22. In general, once the lower portion of fork assembly 100 is coupled with the front wheel assembly 28, and the upper portion of fork assembly 100 is passed through the head tube of frame 22 and coupled with handlebar assembly 36; an embodiment of a front end of bicycle 50 is basically configured.

A number of the components of rear wheel assembly 30 are the same, or similar, to the components of front wheel assembly 28 described herein. As such, a discussion of the similar components will not be repeated, instead the discussion of rear wheel assembly 30 will focus on different components. In one embodiment, rear wheel assembly 30 includes a wheel hub **114*b* located in the center of the inner perimeter of rear wheel assembly 30, the wheel hub 114*b* having an axial opening in a center thereof. In one embodiment, wheel hub 114*b* has at least one rear sprocket 18 mounted thereto. In one embodiment, axle 150*b* is inserted through the axial opening in the center of wheel hub 114*b* such that the rear wheel assembly 30 is perpendicular to, and able to rotate about, axle 150*b***.

In one embodiment, axle **150*b* is coupled to an axle retaining portion of swing arm portion 26 to join rear wheel assembly 30 with swing arm portion 26**.

In one embodiment, swing arm portion 26 includes an adjustable axle retaining structure **300*b* (which is similar to adjustable axle retaining structure 300 but with the additional b indicator to clarify its location on the swing arm portion 26). In general, adjustable axle retaining structure 300*b* removably retains axle 150*b* and in so doing, provides a rotational connection between rear wheel assembly 30 and swing arm portion 26**.

In one embodiment, main frame 24 has a front sprocket assembly 13, and a chain 19 is (one of a number of methods such as belts, shafts, rods, and the like) used to couple the front sprocket assembly 13 with the rear sprocket 18. In one embodiment, adjustable axle retaining structure **300*b* is used to position axle 150*b*, and thus wheel hub 114*b*, such that rear wheel assembly 30 is correctly oriented with respect to swing arm portion 26 and rear sprocket 18 is properly aligned with the front sprocket assembly 13**.

Figure 2A:
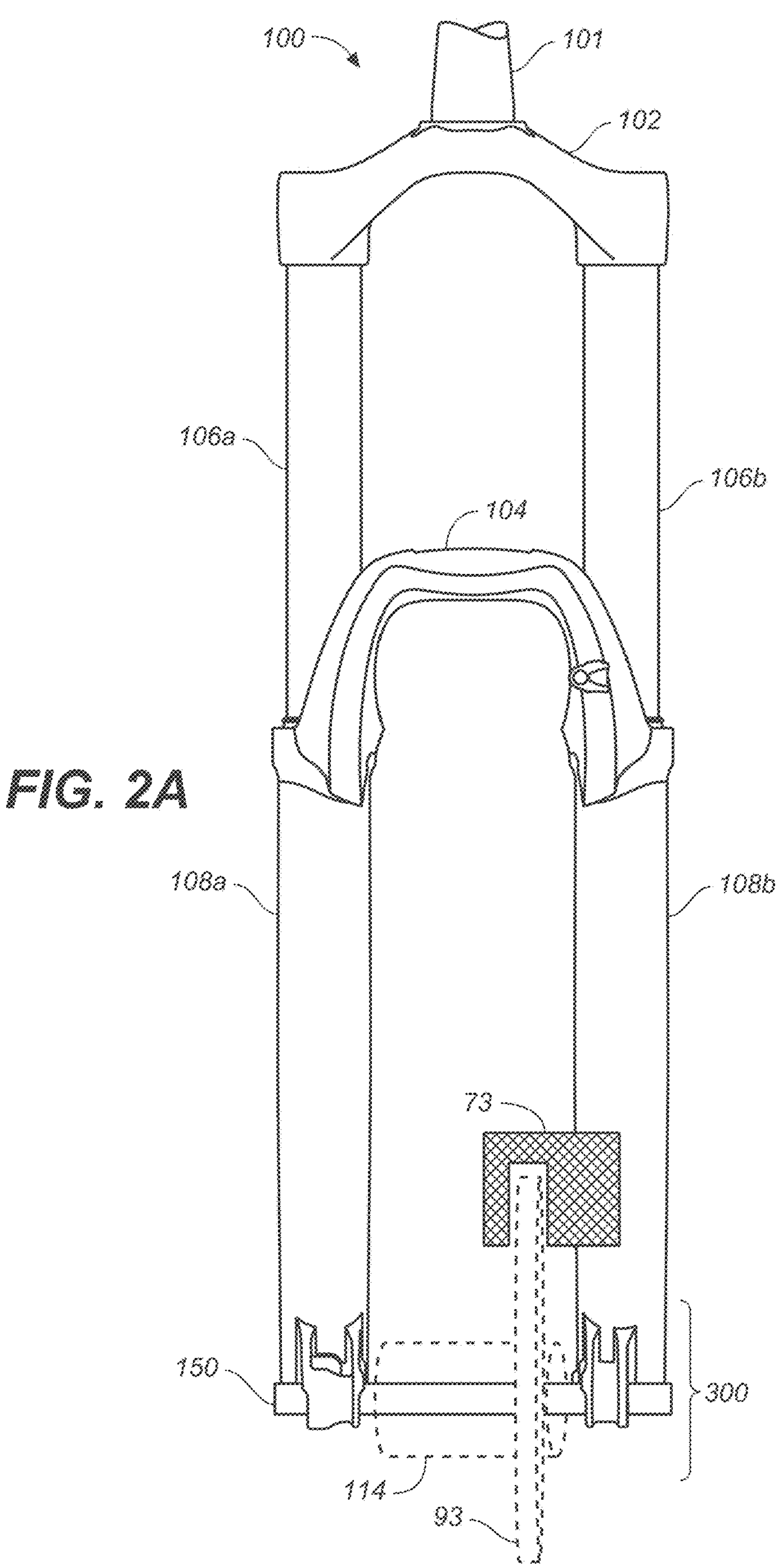
FIG. 2A is a perspective view of a front fork assembly having an adjustable axle retaining structure, in accordance with an embodiment.

Referring now to FIG. 2A, a perspective view of fork assembly 100 having an adjustable axle retaining structure 300 is shown in accordance with an embodiment. As stated herein, fork assembly 100 could be a component for bicycle 50, a unicycle, a tricycle, a moped, a motorcycle, or the like. Although fork assembly 100 is shown in a traditional telescopic configuration, it is appreciated that in another embodiment, fork assembly 100 can be in an inverted telescopic configuration, a hybrid telescopic configuration, or the like.

In one embodiment, fork assembly 100 includes steerer tube 101, a crown 102, two upper leg tubes 106*a* and 106*b*, an arch 104, two lower leg tubes 108*a* and 108*b*, and axle 150.

In one embodiment of fork assembly 100, steerer tube 101 is coupled with crown 102. Often the coupling of steerer tube 101 with crown 102 is performed at the time of manufacture (or assembly) such that the connection of steerer tube 101 with crown 102 will remain fixed for the lifetime of the fork assembly 100. In one embodiment, steerer tube 101 and crown 102 could be manufactured as a single component.

In one embodiment of fork assembly 100, crown 102 is coupled with a first end (or a portion close to a first end) of upper leg tubes 106*a* and 106*b*. In one embodiment, the coupling of crown 102 with upper leg tubes 106*a* and 106*b* is performed at the time of manufacture or assembly such that the connection of crown 102 with upper leg tubes 106*a* and 106*b* is fixed for the lifetime of fork assembly 100. In one embodiment, crown 102 and one or both of upper leg tubes 106*a* and 106*b* are manufactured as a single component.

In one embodiment of fork assembly 100, a portion of the second end (opposite the first end) of the upper leg tubes 106*a* and 106*b* are telescopically coupled with each of a first end of lower leg tubes 108*a* and 108*b*, respectively.

In a regular configuration of fork assembly 100, the two upper leg tubes 106*a* and 106*b* have a smaller outer diameter (OD) than the inner diameter (ID) of the two lower leg tubes 108*a* and 108*b*. As such, the upper leg tubes 106*a* and 106*b* telescopically slide into the lower leg tubes 108*a* and 108*b*, respectively.

In an inverted configuration of fork assembly 100, the two upper leg tubes 106*a* and 106*b* have a larger ID than the OD of the two lower leg tubes 108*a* and 108*b*. As such, the lower leg tubes 108*a* and 108*b* telescopically slide into the upper leg tubes 106*a* and 106*b*, respectively.

In a hybrid configuration of fork assembly 100, one of the upper leg tubes e.g., 106*a* has a larger ID than the OD of one of the lower leg tubes e.g., 108*a*, such that lower leg tube 108*a* telescopically slides into upper leg tube 106*a*; while the other of the upper leg tubes e.g., 106*b* has a smaller OD than the ID of the other of the lower leg tubes e.g., 108*b*, such that upper leg tube 106*b* telescopically slides into lower leg tube 108*b*.

In one embodiment of fork assembly 100, arch 104 fixedly couples lower leg tube 108*a* with lower leg tube 108*b*. In one embodiment, arch 104 and lower leg tubes 108*a* and 108*b* are manufactured as a single component.

In one embodiment of fork assembly 100, the lower portion of lower leg tubes 108*a* and 108*b* contain components of the adjustable axle retaining structure 300 (shown in further detail in FIGS. 3A-4C) which are designed to removably and adjustably retain axle 150. As previously stated, the lower and higher distinction is defined by the distance from the ground plane when the bike 50 is in an erect orientation.

In one embodiment, axle 150 is inserted through the axial opening in the center of wheel hub 114 and retained by adjustable axle retaining structure 300 in the lower leg tubes 108*a* and 108*b* to provide a rotational connection between front wheel assembly 28 and fork assembly 100.

In one embodiment, a disk brake assembly is utilized where the at least one disc brake rotor 93 is attached to at least one side of the wheel hub 114, while at least one disk brake caliper 73 is attached to one or at least one of lower leg tubes 108*a* and/or 108*b*.

In one embodiment, front wheel assembly 28 as shown in FIG. 2A by wheel hub 114 mounted on axle 150 in between the lower leg tubes 108*a* and 108*b*.

Figure 2B:
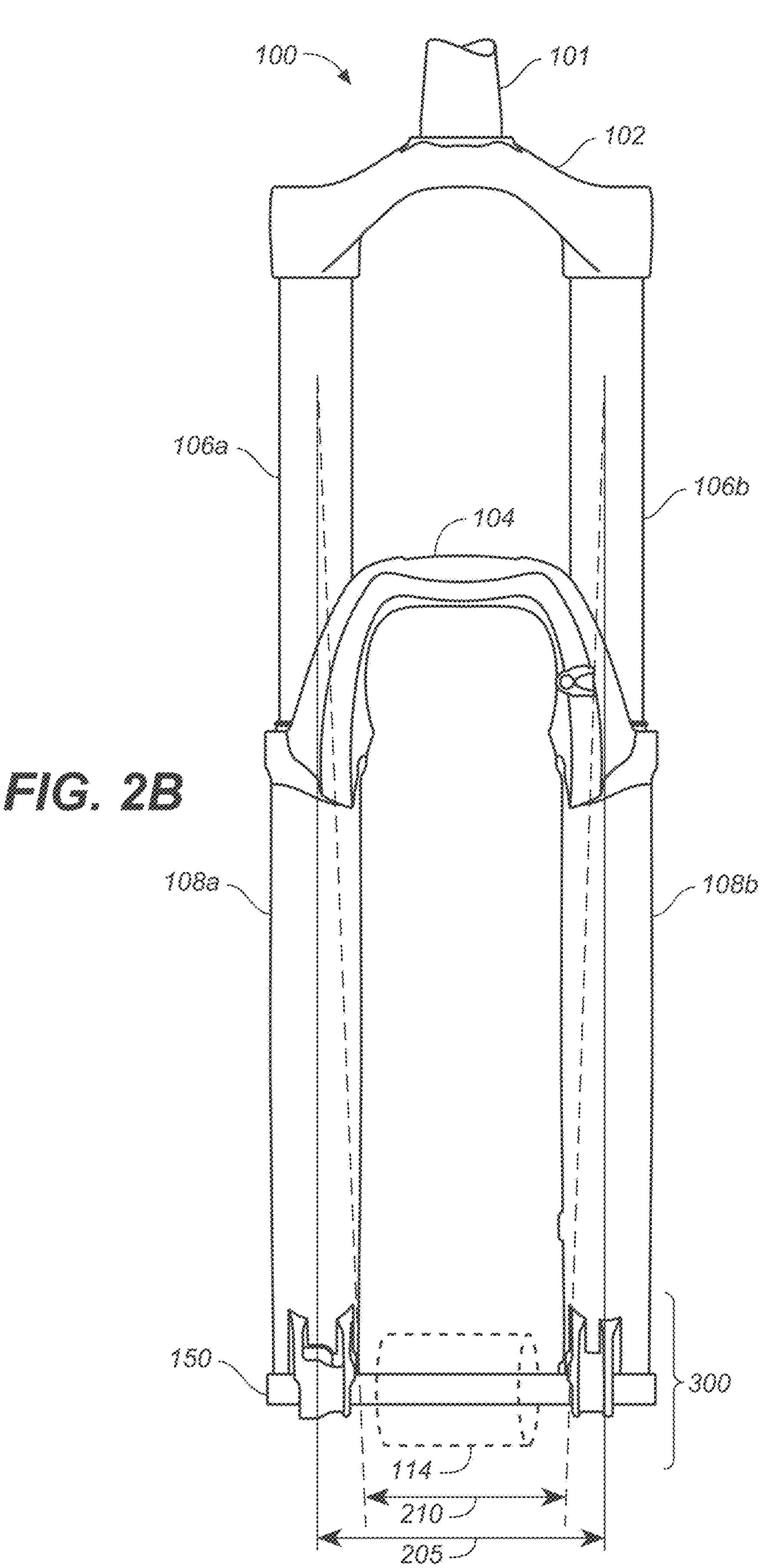
FIG. 2B is a perspective view of the front fork assembly with and without the features of the adjustable retaining structure is shown, in accordance with an embodiment.

Referring now to FIG. 2B, a perspective view of the front fork assembly geometry with and without the features of the adjustable retaining structure is shown in accordance with an embodiment. In one embodiment, upper leg tubes 106*a* and 106*b* are attached to the crown 102 at a given geometry, this geometry is maintained linearly down the upper leg tubes 106*a* and 106*b* as they are telescopically coupled with lower leg tubes 108*a* and 108*b* and the linearity is maintained all the way down lower leg tubes 108*a* and 108*b* until the adjustable axle retaining structure 300 is reached. The resultant spacing 205 is the appropriate spacing for best lifespan and performance of front fork assembly 100, based on the geometry and linear orientation of the upper and lower leg tubes.

However, as shown in FIG. 2B, if the axial length of wheel hub 114 is smaller in length than spacing 205 and the adjustable axle retaining structure 300 is not used, tightening down on axle 150 of the narrower wheel hub 114, to achieve proper orientation and seating between the lower leg tubes 108*a* and 108*b* and the wheel hub 114 will result in a linear deformation of one or more of the leg tubes of front fork assembly 100.

In other words, as the axle is tightened (by tool, quick release, nut and bolt type pinching, etc.) to pull the lower leg tubes 108*a* and 108*b* into proper orientation with wheel hub 114, a bending load is put on front fork assembly 100, as the lower leg tubes 108*a* and 108*b* are pulled closer together until the space between the two is reduced to the narrower spacing 210.

This inward movement of lower leg tubes 108*a* and 108*b* will change the geometry of the proper linear orientation, to a deformed non-linear geometry which would be deformed by an amount equal to the difference between correct spacing 205 and narrower spacing 210.

In one embodiment, the deformed non-linear geometry will increase friction between sliding fork parts (such as lower leg tubes 108*a* and 108*b* and upper leg tubes 106*b* and 106*a*) since the sliding surfaces are no longer properly aligned. This deformed non-linear geometry can also cause other issues such as, but not limited to, seal leaking, fluid contamination, degraded performance, increased wear, and the like. Moreover, since the amount of deformation (e.g., spacing 205-spacing 210) depends on the axial length of wheel hub 114, as different front wheel assemblies are developed with different axial length wheel hub sizes to provide for different performance characteristics, a user would be limited to only those new front wheel assemblies that had wheel hubs that fit within the predefined axial lengths.

Figure 3A:
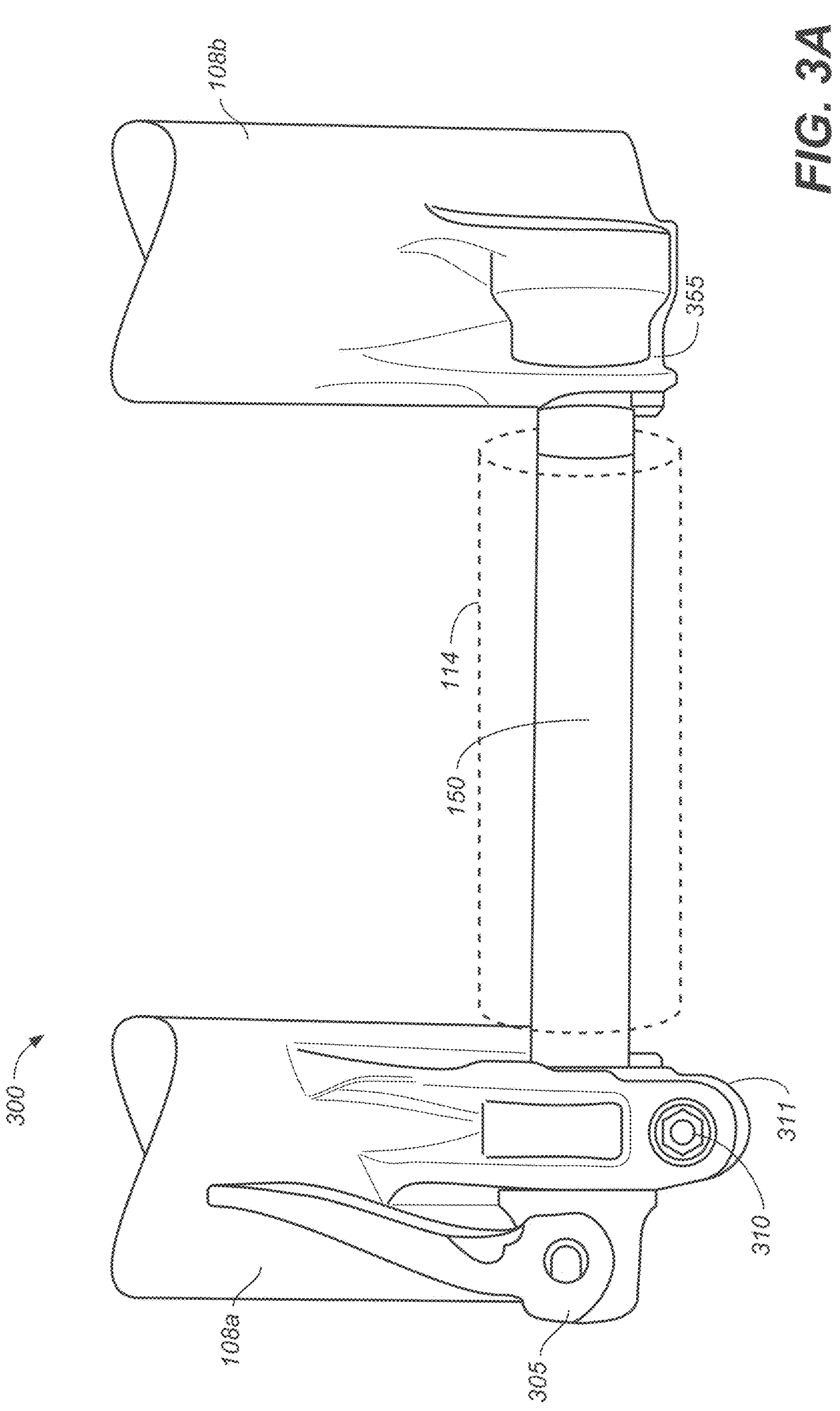
FIG. 3A is a detail view of the adjustable axle retaining structure of the front fork assembly of FIG. 2A, in accordance with an embodiment.

With reference now to FIG. 3A, a detail view of adjustable axle retaining structure 300 (as shown in FIG. 2A) is provided in accordance with an embodiment. In one embodiment, FIG. 3A includes a portion of lower leg tubes 108*a* and 108*b*, hub/axle retaining feature 355, clamp 311, fastener 310, wheel hub 114, and axle 150.

In one embodiment, hub/axle retaining feature 355 is formed as a part of lower leg tube 108*b* during the manufacture process. In another embodiment, hub/axle retaining feature 355 is affixed to lower leg tube 108*a* during assembly such as, via a weld, or the like.

In one embodiment, clamping member 311 is formed as a part of lower leg tube 108*a*. In another embodiment, clamping member 311 is affixed to lower leg tube 108*a* during assembly such as, via a weld, or the like. In one embodiment, a fastener 310 is used to tighten and release clamping member 311. In one embodiment, fastener 310 is a pinch bolt. In another embodiment, fastener 310 could be a screw, bolt, quick release, or other type of fastener.

Figure 3B:
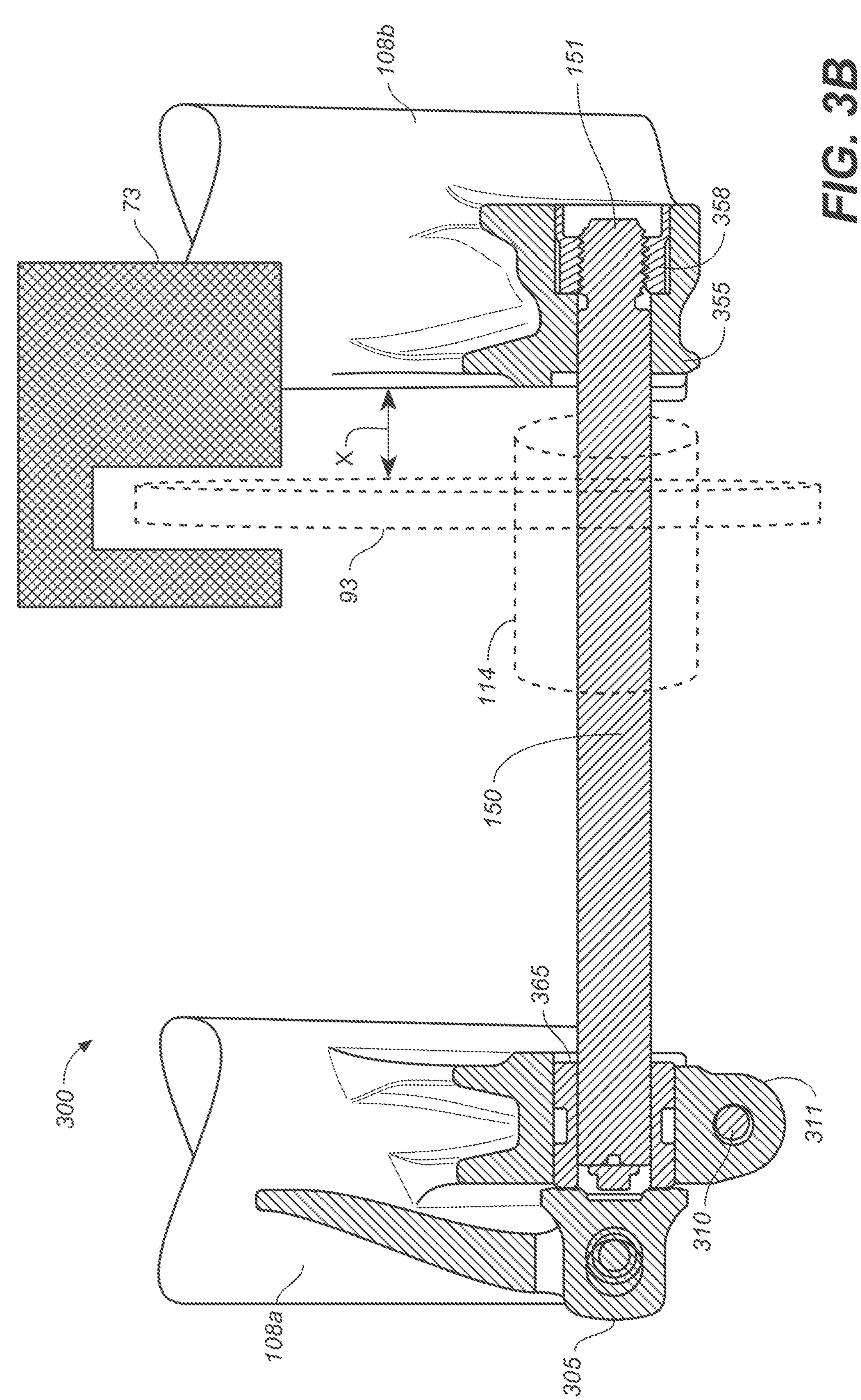
FIG. 3B is a front sectional view of the detail view of FIG. 3A, in accordance with an embodiment.

In one embodiment, a first end of axle 150 is inserted through clamping member 311, then through wheel hub 114, and is then connectively coupled to hub/axle retaining feature 355, a process shown in detail in the front sectional view of FIG. 3B.

In one embodiment, the second end of axle 150 that is extending from clamping member 311 has a quick release 305 to fixedly retain axle 150 with fork assembly 100. In another embodiment, the quick release 305 could be a nut or the like that is not a quick release.

Referring now to FIG. 3B, a front sectional view of the adjustable axle retaining structure 300 is shown in accordance with an embodiment. In one embodiment, FIG. 3B includes a portion of lower leg tube 108*a* including clamp 311, a portion of lower leg tube 108*b* including hub/axle retaining feature 355 and brake caliper 73, fastener 310, axle 150, and wheel hub 114 with rotor 93.

In one embodiment, hub/axle retaining feature 355 has an axle capture sleeve (e.g., sleeve 358) located therewithin. In one embodiment, sleeve 358 is threaded. In one embodiment, hub/axle retaining feature 355 and sleeve 358 are a single piece instead of two different pieces.

In one embodiment, axle 150 has a threaded portion 151 at or about the end that is coupled with hub/axle retaining feature 355. In one embodiment, threaded portion 151 of axle 150 is threaded into the threads of sleeve 358. Although in one embodiment axle 150 and sleeve 358 use threads to make the connection, it should be appreciated that axle 150 and sleeve 358 could utilize other retention methods such as a pin, a screw, an alignment of geometric feature, or the like.

In one embodiment, the shape of hub/axle retaining feature 355 includes a lip such that as threaded sleeve 358 is pulled inward by the tightening of axle 150 it will not be able to move past the lip and impact the interface between hub/axle retaining feature 355 and wheel hub 114. In one embodiment, by maintaining the interface between hub/axle retaining feature 355 and wheel hub 114, each time the wheel hub is installed, the rotor 93 will always be located at distance X from lower leg tube 108*b*. As such, on every install of wheel hub 114, rotor 93 will be aligned with caliper 73.

In one embodiment, clamping member 311 has a wheel hub interface sleeve (e.g., sleeve 365) therein. In one embodiment, when installing axle 150 onto the front fork assembly 100, the side of axle 150 including threaded portion 151 is inserted through clamping member 311 and its associated sleeve 365, through wheel hub 114, and then into hub/axle retaining feature 355 where it is connectively coupled to sleeve 358. Although a round sleeve design is shown, it is exemplary. It should be appreciated that the sleeve 365 and sleeve 358 about axle 150 could be of any geometric shape, thickness, or design.

In one embodiment, after axle 150 has been inserted and connectively coupled with sleeve 358, as quick release 305 is tightened, sleeve 365 will move inward until wheel hub 114 is properly positioned between hub/axle retaining feature 355 and sleeve 365, such that wheel hub 114 is properly located, oriented, and retained between sleeve 365 of lower leg tube 108*a* and hub/axle retaining feature 355 of lower leg tube 108*b*. In so doing, the inward movement of sleeve 365 (as shown in further detail in FIGS. 4A-4C), allows a single front fork assembly 100 geometry to work with wheel hubs of various axial lengths. Thus, unlike prior methods that caused the fork geometry to change when the axial length of a wheel hub is changed, the components of adjustable axle retaining structure 300 allow wheel hubs of different axial lengths to be properly retained without modifying the fork geometry.

In one embodiment, after sleeve 365 is in the appropriate location for wheel hub 114, fastener 310 is tightened until clamping member 311 will hold sleeve 365 in its established location. Thus, after the initial wheel hub 114 installation, clamping member 311 can be used to prevent any movement of sleeve 365 with respect to clamping member 311. In so doing, the fork width will remain fixed to the specific wheel hub 114 (without putting any deforming pressure on fork assembly 100) and no additional adjustment are needed unless the wheel hub 114 is changed.

Figure 4A:
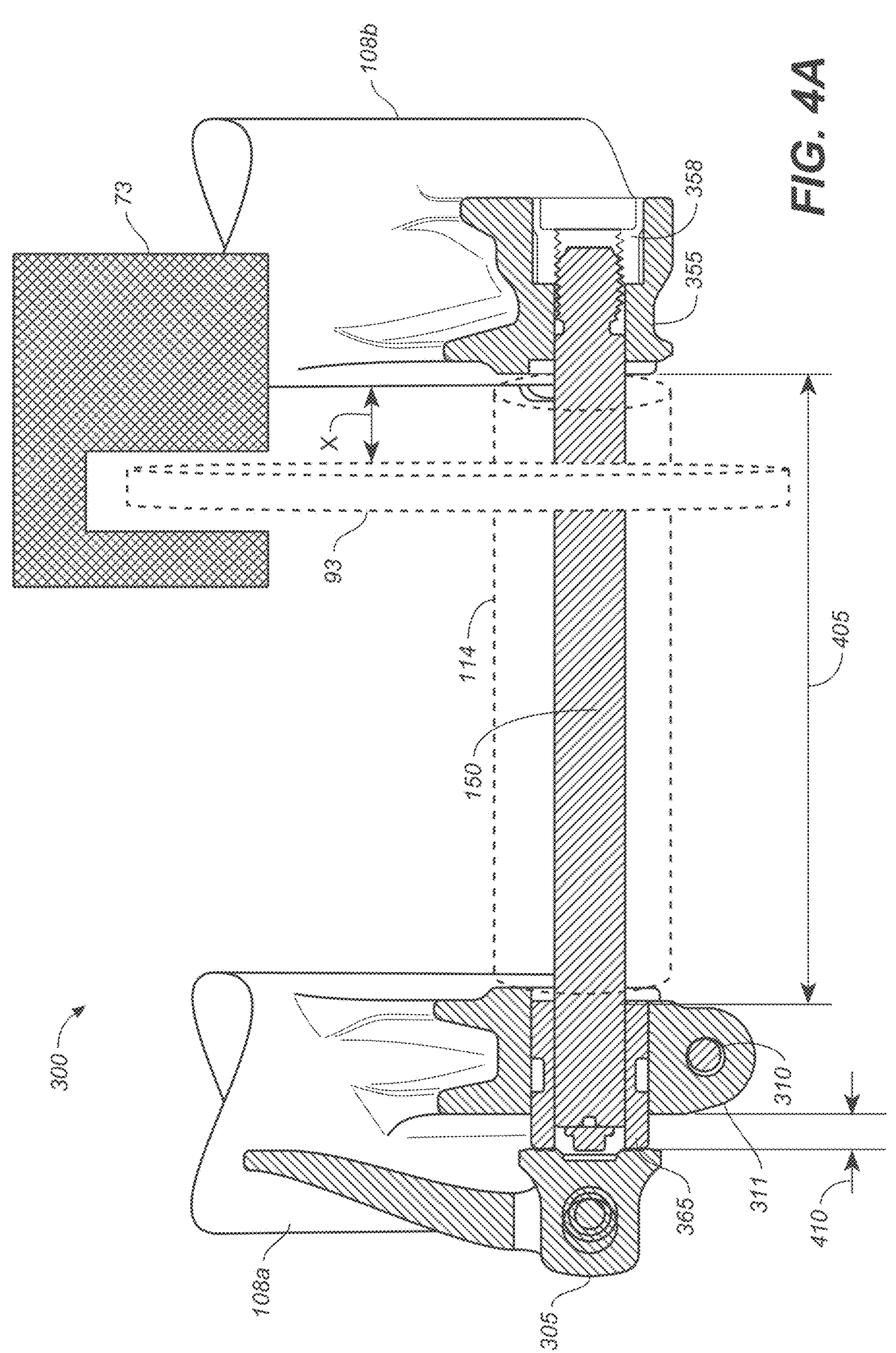
FIGS. 4A-4C are a plurality of different front sectional views the adjustable axle retaining structure of the front fork assembly, in accordance with an embodiment.
Figure 4B:
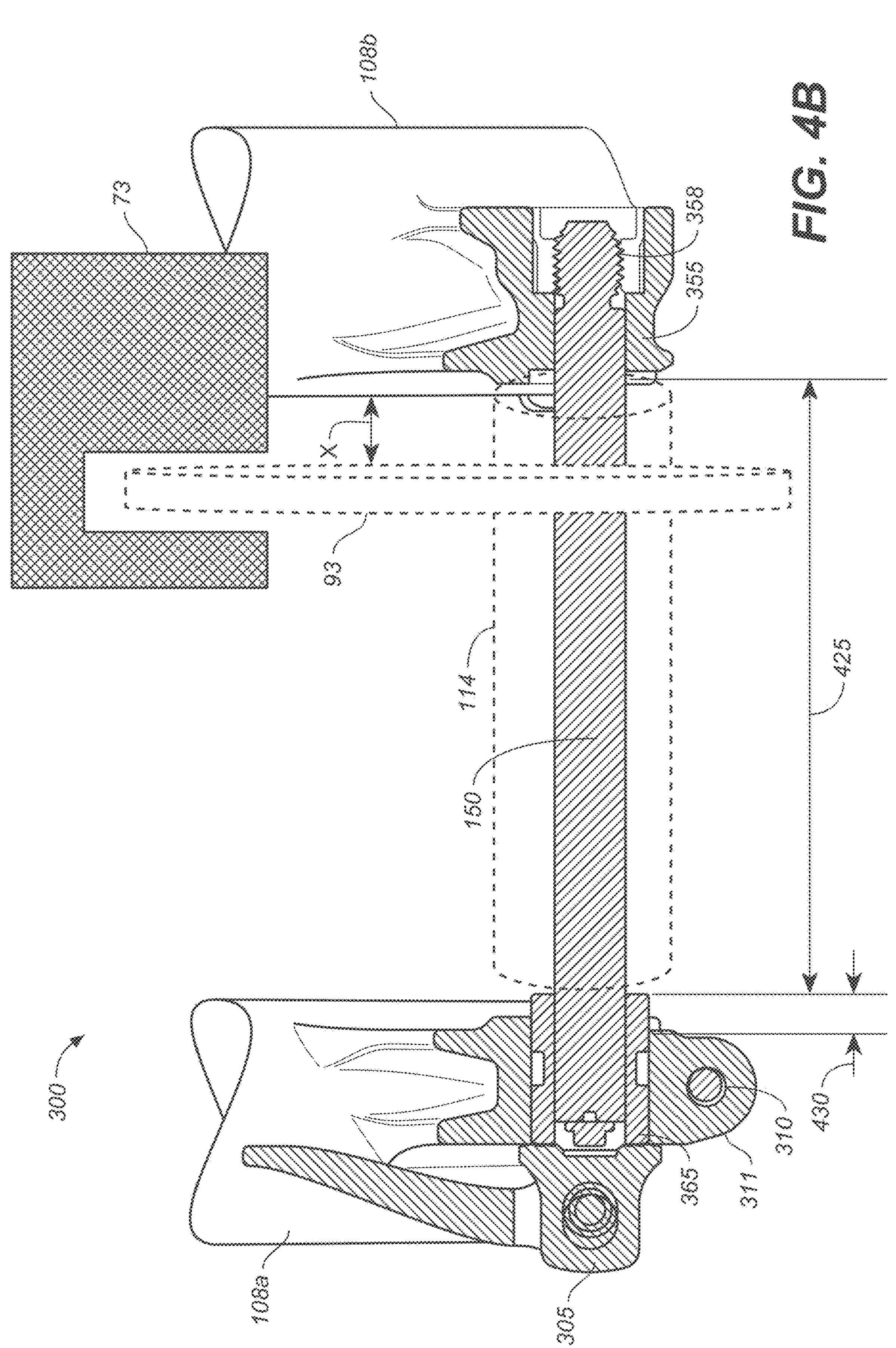
Figure 4C:
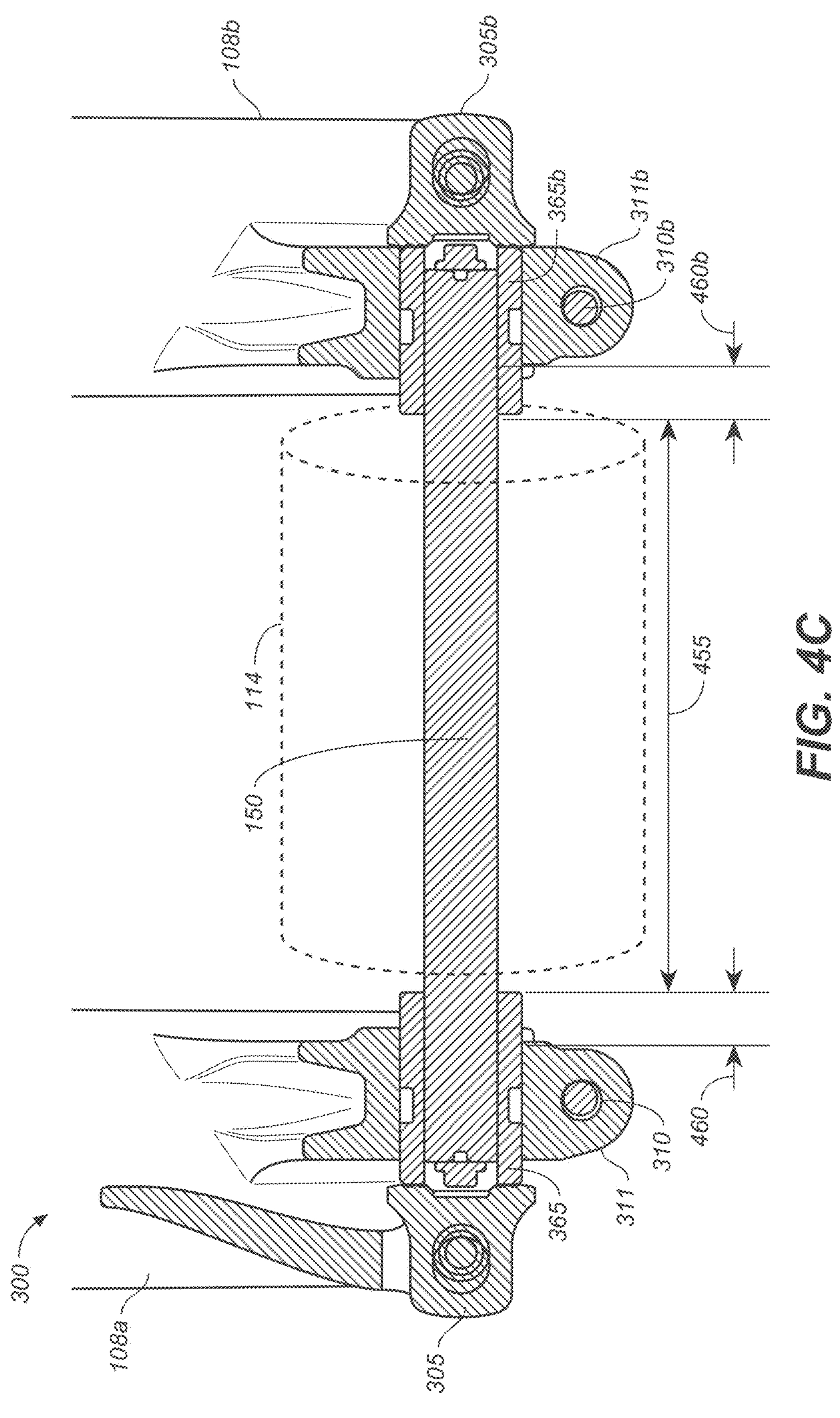

With reference now to FIGS. 4A-4C, a plurality of different front sectional views are shown in accordance with embodiments. In general, FIGS. 4A-4C illustrate three (of a possible infinite number of) different locations of sleeve 365 (and in the two movement side: hub retaining feature 355) depending upon hub width. They are different examples of the application of adjustable axle retaining structure 300.

In one embodiment, as shown in FIG. 4A, the axial length of wheel hub 114 is defined by distance 405 and distance 410 indicates the adjustable range of sleeve 365 to accommodate different hub width variations. As shown in FIG. 4A, the location of sleeve 365 is where sleeve 365 would provide the contact with the hub.

In FIG. 4B, a second hub width 425 is shown and distance 430 indicates the difference in the location of sleeve 365 from the first hub width 405 (as shown in FIG. 4A) to the new second hub width 425. As shown in FIG. 4B, the location of sleeve 365 has moved and indicates where sleeve 365 would provide the contact with the hub. As further shown in FIG. 4B, the location of the interface between hub/axle retaining feature 355 and the associated side of wheel hub 114 has not changed. Further, the distance X between rotor 93 and lower leg tube 108*b* has also not changed. Therefore, even though the hub width has been reduced by amount 403, the rotor 93 is still aligned with caliper 73 and the fork assembly 100 tube geometry has not changed.

In one embodiment, the design of hub retaining feature 355 is built to couple with lower leg tube 108*b* such that hub retaining feature 355 does not move during the installation. As such, the front brake disk side of the front wheel would always be in its appropriate location with respect to the lower leg tube 108*b*. Thus, the center of a wheel with a smaller hub would be slightly offset toward lower leg tube 108*b*.

Referring now to FIG. 4C, an embodiment of an adjustable axle retaining structure 300 is shown in accordance with an embodiment. In one embodiment, lower leg tube 108*a* has clamping member 311, fastener 310, and sleeve 365. Similarly, in one embodiment, lower leg tube 108*b* has clamping member 311*b*, fastener 310*b*, and sleeve 365*b*. Axle 150 has a quick release 305 on one end and a fastener 305*b* on the other.

For example, in FIG. 4C a hub width 455 is shown. Distance 460 is the inward movement made from clamping member 311 by sleeve 365 necessary to contact wheel hub 114. Distance 460*b* is equivalent to distance 460 and is the inward movement made from clamping member 311*b* by sleeve 365*b* that was necessary to contact wheel hub 114. In one embodiment, once sleeve 365 was in position, fastener 310 would be used to tighten down clamping member 311 to stop any further movement of sleeve 365. Similarly, in one embodiment, once sleeve **365*b* was in position, fastener 310*b* would be used to tighten down clamping member 311*b* to stop any further movement of sleeve 365*b***.

As such, when quick release 305 is tightened down to secure wheel hub 114 both sleeve 365 and sleeve **365*b* will have moved inward with respect to lower leg tubes 108*a* and 108*b* such that wheel hub 114 (and thus the entire front wheel assembly 28) will be in a centered location with respect to fork assembly 100**.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A fork assembly comprising:

a crown;

a first leg coupled to said crown;

a second leg coupled to said crown;

said first leg or said second leg comprises a hub/axle retaining feature; and an axle configured to couple a wheel hub between said first leg of said fork assembly and said second leg of said fork assembly;

wherein said hub/axle retaining feature is further configured to maintain an acceptable geometry for said fork assembly, said acceptable geometry at least partially defined by a separation distance between said first leg of said fork assembly and said second leg of said fork assembly, said hub/axle retaining feature enabling wheel hubs of different axial lengths to be retained between said first leg of said fork assembly and said second leg of said fork assembly without deviating from said acceptable geometry for said fork assembly.

2. The fork assembly of claim 1, wherein said hub/axle retaining feature further comprises:

a retention feature, said retention feature configured to retain said axle with said fork assembly.

3. The fork assembly of claim 1, wherein said hub/axle retaining feature further comprises:

an extending portion, said extending portion limiting an axial distance, with respect to said axle, to which said wheel hub is able to move between said first leg of said fork assembly and said second leg of said fork assembly.

4. The fork assembly of claim 1, further comprises:

a wheel hub interface sleeve, said wheel hub interface sleeve configured to move axially, with respect to said axle, and maintain said acceptable geometry and enable said wheel hubs of said different axial lengths to be retained between said first leg of said fork assembly and said second leg of said fork assembly without deviating from said acceptable geometry for said fork assembly.

5. The fork assembly of claim 4 further comprising:

a clamping member; and a fastener, said clamping member and said fastener configured to secure said wheel hub interface sleeve at a desired location.

6. A hub/axle retaining feature comprising:

an at least partially tubular member having a first end and a second end;

an opening defined by said at least partially tubular member, wherein said opening is configured to receive an axle therein, said hub/axle retaining feature is configured to be provided on a first leg of a fork assembly or on a second leg of said fork assembly; and wherein said at least partially tubular member is configured to couple with said axle and maintain an acceptable geometry for said fork assembly, said acceptable geometry at least partially defined by a separation distance between said first leg of said fork assembly and said second leg of said fork assembly, said hub/axle retaining feature enabling wheel hubs of different axial lengths to be retained between said first leg of said fork assembly and said second leg of said fork assembly without deviating from said acceptable geometry for said fork assembly.

7. The hub/axle retaining feature of claim 6 further comprising:

a retention feature, said retention feature configured to retain said axle with said fork assembly.

8. The hub/axle retaining feature of claim 7, wherein said retention feature further comprises:

a threaded portion, said threaded portion configured to threadedly couple with said axle.

9. The hub/axle retaining feature of claim 7, wherein said retention feature is selected from the group consisting of: a pin, a screw, and an alignment feature.

10. The hub/axle retaining feature of claim 6, further comprising:

an axle capture sleeve, said axle capture sleeve configured to retain said axle with said fork assembly.

11. The hub/axle retaining feature of claim 10, wherein said axle capture sleeve further comprises:

an axle fixing feature, said axle fixing feature configured to couple said axle capture sleeve and said axle.

12. The hub/axle retaining feature of claim 11 wherein said axle fixing feature is selected from the group consisting of: a pin, a screw, and an alignment feature.

13. The hub/axle retaining feature of claim 6 wherein said opening extends completely through said at least partially tubular member.

14. The hub/axle retaining feature of claim 6 wherein one end of said at least partially tubular member is closed.

15. The hub/axle retaining feature of claim 6 wherein said hub/axle retaining feature is configured to be fastened to said first leg of said fork assembly or said second leg of said fork assembly.

16. The hub/axle retaining feature of claim 6 wherein said hub/axle retaining feature is integrated with said first leg of said fork assembly or said second leg of said fork assembly.

17. The hub/axle retaining feature of claim 6 further comprising:

a lip, said lip configured to provide a limit on axial motion of a wheel hub toward said first leg of said fork assembly or said second leg of said fork assembly.

18. The hub/axle retaining feature of claim 6 further comprising:

a wheel hub interface sleeve, said wheel hub interface sleeve configured to move axially, with respect to said axle, and maintain said acceptable geometry and enable said wheel hubs of said different axial lengths to be retained between said first leg of said fork assembly and said second leg of said fork assembly without deviating from said acceptable geometry for said fork assembly.

19. The hub/axle retaining feature of claim 18 further comprising:

a clamping member; and a fastener, said clamping member and said fastener configured to secure said wheel hub interface sleeve at a desired location.

* * * * *